(12) United States Patent
Hoffman et al.

(10) Patent No.: US 6,341,528 B1
(45) Date of Patent: Jan. 29, 2002

(54) STRAIN SENSING STRUCTURE WITH IMPROVED RELIABILITY

(75) Inventors: James H. Hoffman, Santa Clara; David E. Wagner, Los Gatos; Gerald Lopopolo, San Jose, all of CA (US)

(73) Assignee: Measurement Specialties, Incorporated, Fairfield, NJ (US)

( * ) Notice: Subject to any disclaimer, the term of this patent is extended or adjusted under 35 U.S.C. 154(b) by 0 days.

(21) Appl. No.: 09/438,879

(22) Filed: Nov. 12, 1999

(51) Int. Cl.[7] ................................................. G01B 7/16
(52) U.S. Cl. ........................................................ 73/777
(58) Field of Search ............................ 73/777, 779, 780, 73/862.627, 862.68, 718, 720, 721, 724, 726, 727

(56) References Cited

U.S. PATENT DOCUMENTS

| | | | |
|---|---|---|---|
| 3,341,794 A | 9/1967 | Stedman | 338/4 |
| 4,050,313 A | 9/1977 | Shimada et al. | 73/398 AR |
| 4,065,971 A | 1/1978 | Shimazoe et al. | 73/727 |
| 4,400,681 A | 8/1983 | Brown et al. | 338/4 |
| 4,904,978 A | 2/1990 | Barth et al. | 338/47 |
| 5,172,205 A | * 12/1992 | French et al. | 257/414 |
| 5,178,016 A | * 1/1993 | Dauenhauer et al. | 73/727 |
| 5,369,544 A | 11/1994 | Mastrangelo | 361/283.4 |
| 5,376,853 A | * 12/1994 | Fushimi | 310/312 |
| 6,122,972 A | * 9/2000 | Crider | 73/724 |

FOREIGN PATENT DOCUMENTS

| | | |
|---|---|---|
| CH | 679700 A5 | 3/1992 |
| EP | 0 269 759 | 6/1988 |
| EP | 0 320 299 | 6/1989 |
| EP | 0 647 832 | 4/1995 |
| GB | 1 354 009 | 5/1974 |
| GB | 1 463 087 | 2/1977 |

OTHER PUBLICATIONS

A.J. Auberto–Herve, "SOI Materials for ULSI Applications", Semiconductor International, Oct. 1995.
"Solid–State Pressure Sensors Handbook", vol. 16, published by SenSym, Inc., 1998, pp. 8–70 to 8–73, 8–92 and 8–93.

* cited by examiner

*Primary Examiner*—Max Noori (57) ABSTRACT

A strain-sensing device comprises a metal, glass, ceramic, or plastic cell that has formed within it a diaphragm characterized by a thin layer of material bounded by a thick layer of material. A silicon strain gauge, either junction isolated or dielectric isolated, is attached directly to the diaphragm. The strain gauge has at least one sensing element that is aligned such that applied pressure to the diaphragm induces a strain in the sensing element. The silicon strain gauge has a triangular shape that is optimizes the performance and reliability of the sensor with the added benefit of making it more affordable as well.

25 Claims, 6 Drawing Sheets

STRAIN SENSING STRUCTURE WITH IMPROVED RELIABILITY

FIELD OF THE INVENTION

The present invention relates to media compatible pressure sensing devices and methods for their fabrication. More specifically, this invention relates the design of a media compatible pressure-sensing device capable of high sensitivity to pressure with improved reliability.

BACKGROUND OF THE INVENTION

Measuring pressure in ultra clean environments or environments containing harsh media has always been a challenge. There has been a continuous effort to produce affordable, reliable, media compatible pressure sensors.

Originally metal strain gauges were prevalent. These strain gauges comprised four resistors arranged in a Wheatstone bridge configuration such that two opposite resistors would increase in resistance with applied pressure and the other two would decrease with applied pressure. The resistance change was due to the dimensional changes in the metal resistors.

Other circuit configurations have also been used, but the four-resistor Wheatstone bridge configuration is still prevalent.

The more sensitive silicon micro electromechanical system ("MEMS") based devices replaced many of the metal strain gauges. In these devices, resistors are formed within a silicon diaphragm by ion implantation or diffusion. These resistors exhibit a piezoresistive effect such that two opposite resistors increase in resistance and two decrease in such a way that each output changes in opposite ways. Metal (such as aluminum) is applied to the diaphragm for interconnects and pads for wire bonding. MEMS devices often require protection to make them media compatible.

Metal, glass, ceramic, plastic, or other chemically compatible diaphragms are used to protect silicon pressure sensors from harsh media. When using such diaphragms, a fluid (such as oil) is used to transfer the pressure from the chemically compatible diaphragm to the silicon diaphragm.

Some applications cannot tolerate the chance of an oil leak if there were to be some sort of diaphragm rupture. In this case, silicon strain gauges are used. Silicon strain gauges are often relatively long and thin. They are fragile, difficult to match and difficult to handle. Their use requires them to be attached directly to a metal, glass, ceramic, or plastic diaphragm.

A silicon chip can also be attached directly to a metal, glass, ceramic, or plastic diaphragm. In this case, all four resistors can be placed on one chip. These chips are less fragile, easier to position, and intrinsically matched. However, all four resistors must necessarily be very close together. Optimizing performance by judiciously locating resistors on the diaphragm cannot be done without adding additional Wheatstone bridge circuits that can make temperature compensations more difficult.

All of the above technologies are commercially available today.

SUMMARY OF THE INVENTION

A pressure transducer in accordance with the present invention comprises a novel pressure sensing structure. This structure includes a body of a first material within which a diaphragm is constructed. The diaphragm, in one embodiment contains a relatively thick boss centrally located. This diaphragm provides media isolation from the sensor. One or more pressure sensing elements is attached to the diaphragm with a second material. Each pressuresensing element comprises a triangular chip with one or more strain-sensing elements on it. In one embodiment, the triangular chip is a semiconductor material such as silicon. Typically, each strain-sensing element is a resistor that is electrically isolated by a dielectric layer in a silicon-on-insulator structure. Dielectric isolation enables performance at higher temperatures. Alternatively, junction isolated resistors can be used. The pressure sensing chips are located close to areas of maximum absolute stress. The triangular shape improves the reliability.

The resistors are typically piezoresistive. In lieu of resistive strain sensing elements, in other embodiments, capacitive strain sensing elements are used. In such an embodiment, stress changes the capacitance exhibited by the capacitive strain sensing elements.

In another embodiment, piezoelectric strain sensing elements are used. Stress changes the voltage across the piezoelectric strain sensing elements.

BRIEF DESCRIPTION OF THE DRAWINGS

FIGS. 10A and 10B are top views of the structure shown in FIG. 1. FIG. 10A displays the proper position and orientation of any of the chip configurations shown in FIGS. 5A, 6A, and 8A. FIG. 10B displays the proper position and orientation of any of the chip configurations shown in FIGS. 5B, 5C, 6B, 6C, 8B, and 8C.

FIGS. 11A and 11B are top views of the structure with the boss as shown in FIG. 2. FIG. 11A displays the proper position and orientation of any of the chip configurations shown in FIGS. 5A, 6A, and 8A. FIG. 11B displays the proper position and orientation of any of the chip configurations shown in FIGS. 5B, 5C, 6B, 6C, 8B, and 8C.

FIG. 12A, 12B, 12C, 12D are top views of structures with two triangular chips positioned along the diaphragm in order to compensate for body mounting stress. FIGS. 12A and 12B apply to diaphragms with a central boss.

DETAILED DESCRIPTION

In reference to the drawings, like numerals represent like materials through the various figures.

Figure 1:
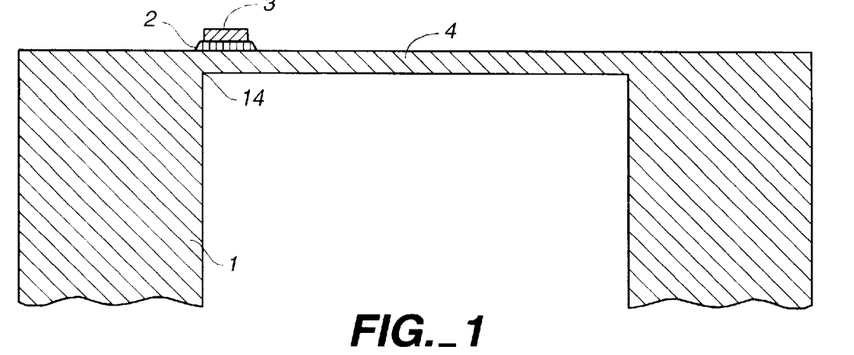
FIG. 1 is a cross section side view of a thin diaphragm with a silicon strain gauge bonded to the surface near an edge of the diaphragm.

In FIG. 1, a body 1 is composed of a material resistant to or impervious to the media for which it is intended. This material can be a metal such as any grade of steel, galvanized steels, and any stainless steel alloy as well as molybdenum. This material also can also be a ceramic, glass, plastic and other polymer materials such as Teflon (PTFE), Ultem and nylon. Within this body a relatively thin diaphragm 4 is formed such that its dimensions are sized according to known scientific principles so that the proper amount of strain is generated at the locations of the pressure sensing elements to achieve the desired performance for the pressure range specified. Diaphragm 4 can be formed by any method including stamping, etching, welding, and machining to achieve the desired dimensions. The non-diaphragm part of body 1 must be thick enough to be considered rigid within the desired pressure range.

Figure 2:
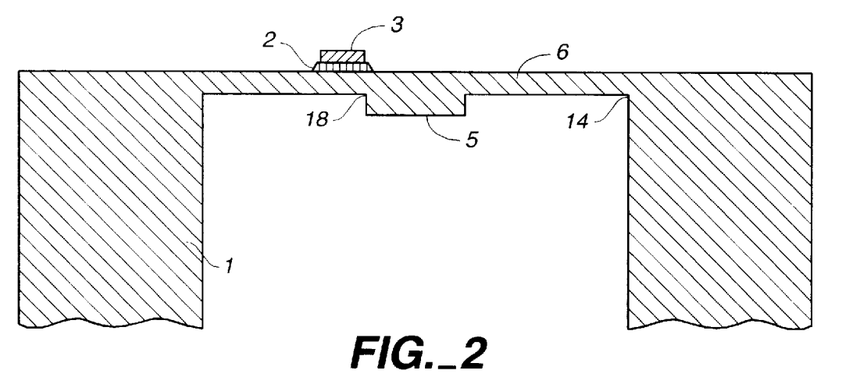
FIG. 2 is a cross section side view similar to FIG. 1 except that the diaphragm contains a thick boss region in the center of the diaphragm. The silicon strain gauge is mounted near the edge of the boss on the thin diaphragm.

In another embodiment, in lieu of diaphragm 4, a diaphragm 6 is provided that includes a central boss structure 5 composed of the same material as diaphragm 6 (FIG. 2). The thickness of boss structure 5 is such that it is rigid for all intents and purposes compared to a diaphragm 6. Diaphragm 6 is annular.

To this diaphragm 4 or 6 at least one pressure-sensitive element 3 is attached. The material used to attach element 3 to the diaphragm can be any appropriate material, e.g. a eutectic material, solder, glass, epoxy or other polymer material. If solder is used, the backside of the pressure-sensing element must be wetable by the solder or be covered with a metal layer that is wetable by the solder. Bonding can be performed using any other appropriate method as well.

Description of the Pressure-sensing Element

Pressure-sensing element 3 may be of any material exhibiting the piezoresistive effect. This may include silicon, silicon composites, gallium arsenide, and the like. Most commonly, monocrystaline silicon would be used because of its relative affordability.

Figure 3:
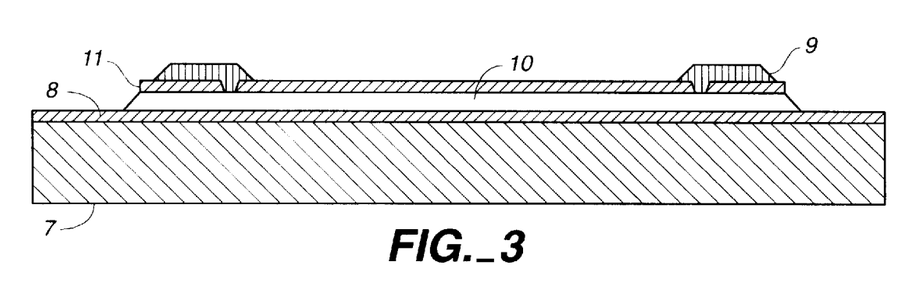
FIG. 3 is a cross section view of the silicon sensor chip. In this embodiment the chip has a silicon-on-insulator structure.

Referring to FIG. 3, a first embodiment of element 3 consists of a silicon-on-insulator structure. Element 3 comprises a substrate 7 that can be monocrystaline silicon. Substrate 7 is typically less than 100 μm thick. A buried layer of dielectric material 8 is formed in substrate 7. Buried layer 8 is preferably silicon dioxide, but any dielectric compatible with the adjoining materials would do. A top layer 10 of preferably monocrystaline silicon is formed on buried layer 8 and doped with boron to form p-type silicon material. Top layer 10 serves as a resistor, and has piezoresistive properties. The doping of top layer 10 can be done with ion implantation, diffusion, epitaxial growth or any combination thereof. A cap layer 11 of dielectric (preferably silicon dioxide) covers the resistor areas. The field (i.e. portions of the structure away from the resistor) is etched using dry etching techniques or wet etching techniques to remove the silicon from around the resistor areas down to dielectric layer 8. This leaves the patterned resistor areas electrically isolated from any other structures on the pressure-sensing element. (Although only one resistor is shown in FIG. 3, as explained in more detail below, more than one resistor can be formed on substrate 7.)

Buried layer 8 can be formed in a number of ways, e.g. using a BESOI or SIMOX process. See, for example, Auberton-Herve et al., "SOI Materials for ULSI Applications", published in Semiconductor International in October 1995, incorporated herein by reference. See also "New Bonding Technology for SOI: Unibond" published by SOITEC USA, Inc. of Peabody, Mass., also incorporated herein by reference.

Openings are made in cap layer 11 for contacts to the resistor(s). Metal 9 is then deposited, patterned and etched, leaving pads for wire bonding and connections to the individual resistor(s). The metal can be any metalization scheme suitable for wire bonding. This metal may be aluminum, TiW/Au, Cr/Au, Cr/Ni/Au or any other wire bondable structure. The resistors are aligned in the <110> crystal direction in order to achieve a maximum change in resistance with applied strain. Because the structure of FIG. 3 uses a dielectric layer (layer 8) to isolate the resistor (layer 10), it is advantageous if any part of the required operating temperature range exceeds 125° C. In addition, dielectric resistor isolation is thought to contribute to long term sensor stability. This structure is superior to a similar structure based on polysilicon resistors since monocrystaline silicon resistors have a significantly greater sensitivity to strain. However, the present invention can also be practiced using polysilicon resistors.

Figure 4:
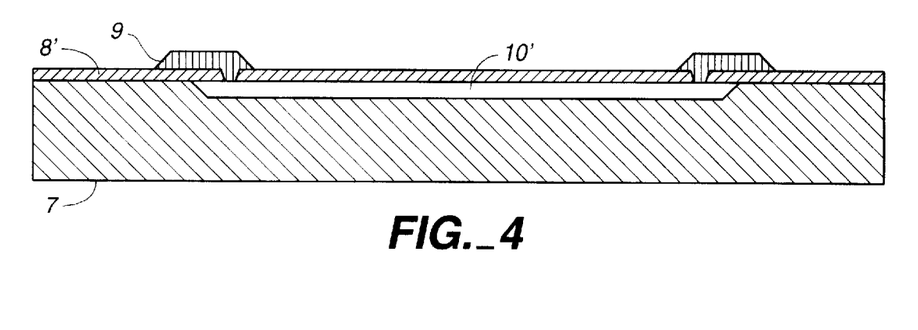
FIG. 4 is a cross section view of the silicon sensor chip with a junction isolated resistor.

Another embodiment of sensing element 3 is shown in FIG. 4 and comprises a monocrystaline n-doped silicon substrate 7 within which a layer of boron doped, p-type silicon 10' is formed. The doping can be done with ion implantation and/or diffusion. A dielectric layer 8', preferably silicon dioxide, covers the resistor areas and the field. This leaves the patterned resistor area junction isolated. Openings are made in dielectric layer 8' for electrical contacts to the resistor(s). Metal 9 is deposited, patterned and etched, leaving pads for wire bonding and connections to the individual resistor(s). The metal can be any metalization scheme suitable for wire bonding. This metal may be aluminum, TiW/Au, Cr/Au, Cr/Ni/Au or any other wire bondable structure. The resistors are aligned in the <110> direction in order to achieve maximum change in resistance with applied strain. This embodiment is sufficient for operating temperatures up to 125° C. and is significantly more affordable. (Above 125° C., an undesirable amount of leakage current may flow between p-type region 10' and substrate 7.)

Description of the Triangular Shaped Pressure-sensing Element

For the embodiments of FIGS. 3 and 4, a triangular shape of the sensing element offers an improvement over the existing state of the art. The magnitude of the strain is highest at edge 14 of diaphragm 4 (for the embodiment of FIG. 1) and at both the inside and outside edges 14,18 of diaphragm 6 with the central boss 5 (for the embodiment of FIG. 2). This is also the location for greatest change in the strain. It is desirable to position a sensing element at the point of greatest strain in order to maximize the sensitivity to pressure If sensing element 3, being of finite dimensions, straddles this location, element 3 will experience a wide variation of strain across it. All of this can lead to mechanical fatigue and premature failure. Placing element 3 completely on the diaphragm side of the highest stress point creates a more uniform strain across it. Using a triangular shaped sensing element with one point touching the highest stress point minimizes strain effects that can lead to failure, yet maximizes the average strain across the strain-sensing e lement. In contrast, a rectangular sensing element can be placed in the same position with an edge parallel to the diaphragm edge but the number of pressure cycles it could withstand would be significantly less. Temperature cycling exposes the sensing element to the same type of failure mechanism.

Figure 5A:
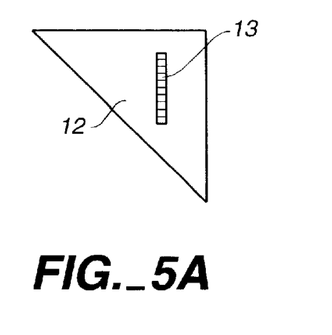
FIGS. 5A, 5B, and 5C depict various embodiments of single resistor formed within a triangular chip.
Figure 5B:
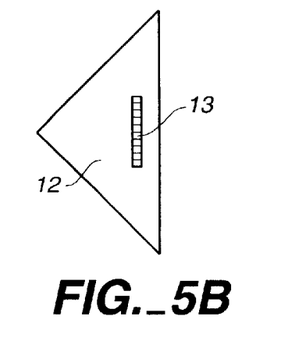
Figure 5C:
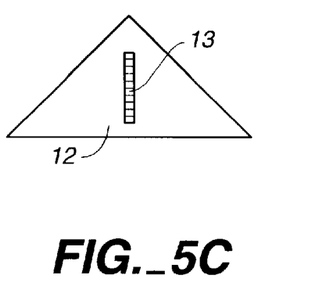

FIGS. 5A, 5B and 5C illustrate in plan view three embodiments of a triangular chip comprising a single piezoresistive strain sensing element 13. The strain sensing element is shown as a simple rectangular region. The required metal pad and contacts are not shown in FIGS. 5 for sake of clarity. Preferably, the longitudinal axes of strain sensing elements 13 are parallel to the <110> crystal direction (or a member of the <110> family of axes) for maximum pressure sensitivity in the finished device. The advantage of a single strain-sensing element per triangular chip is that each chip can be placed at different places around the diaphragm in order to compensate for body mounting stresses.

Figure 10A:
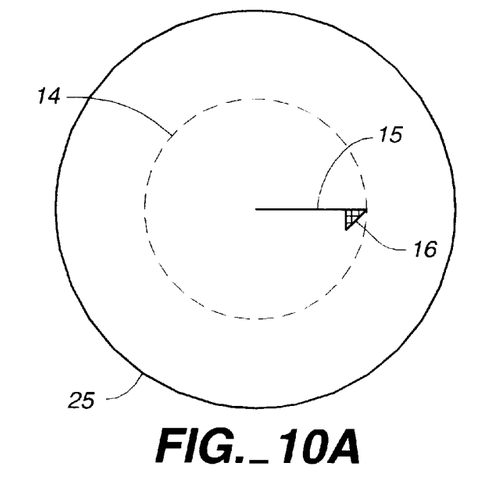
Figure 10B:
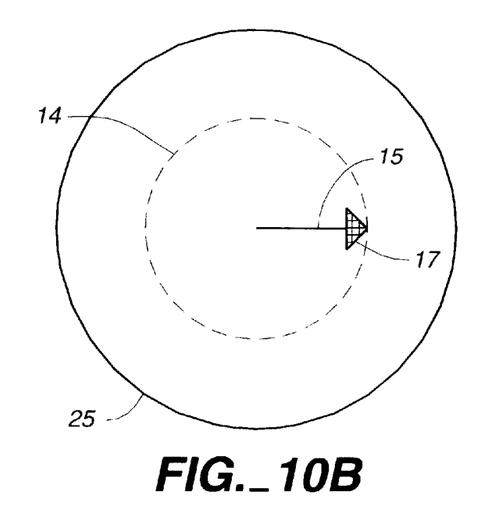

FIGS. 10A and 10B show two embodiments of triangular sensing element 16 with one strain-sensing element orientation and sensing element 17 with another strain-sensing element orientation. FIGS. 10A and 10B are top views where the point of greatest strain is represented by a dashed line 14. In both cases the sensing element is aligned such that the <110> direction (indicated by line 15) is perpendicular to a tangent to line of greatest strain 14. In the special case of a circular diaphragm the <110> direction is parallel to the radius of the diaphragm.

In addition, the sensing element touches the line of greatest stress at a point with the corner of the triangle.

Figure 11A:
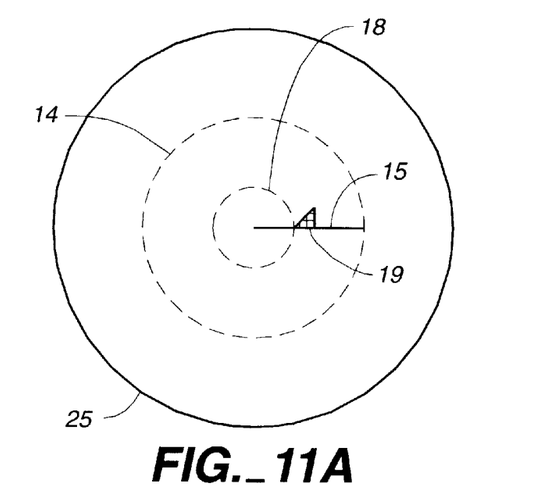
Figure 11B:
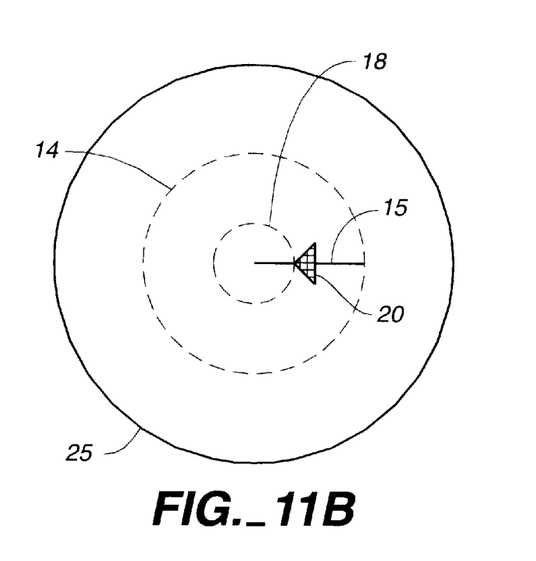

FIGS. 11A and 11B are other embodiments where the diaphragm contains a central boss. The region of greatest stress is represented by an inside dashed line 18 around the boss and an outer dashed line 14. The chip locations shown in FIGS. 10A and 10B function here as well, but the preferred embodiment is to place the chips touching inner line 18. In both cases the chip 19 (and 20) is aligned such that the <110> direction 15 is perpendicular to a tangent to the line of greatest strain 18.

Figure 12A:
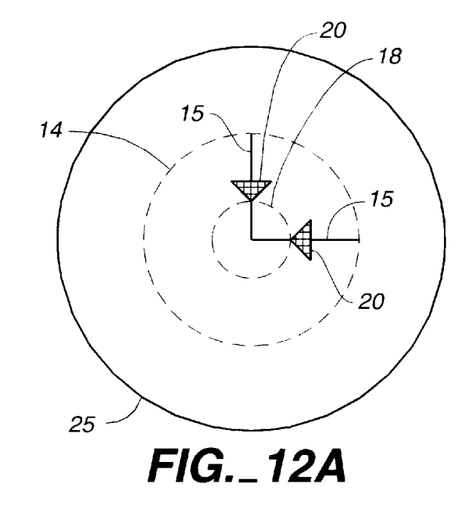
Figure 12B:
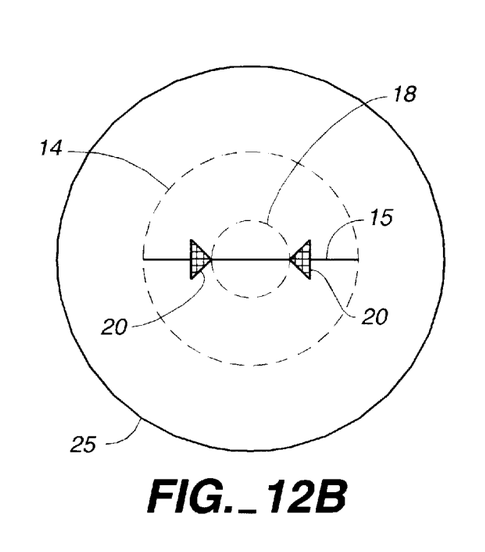
Figure 12C:
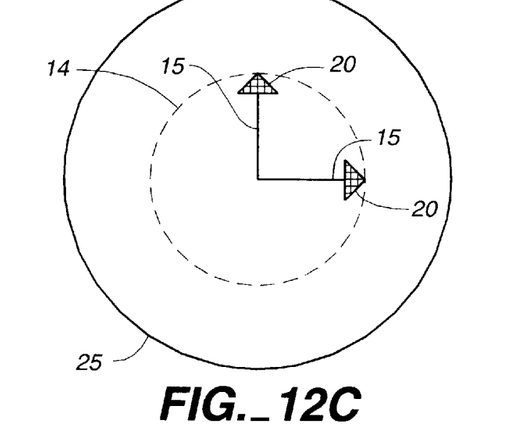
Figure 12D:
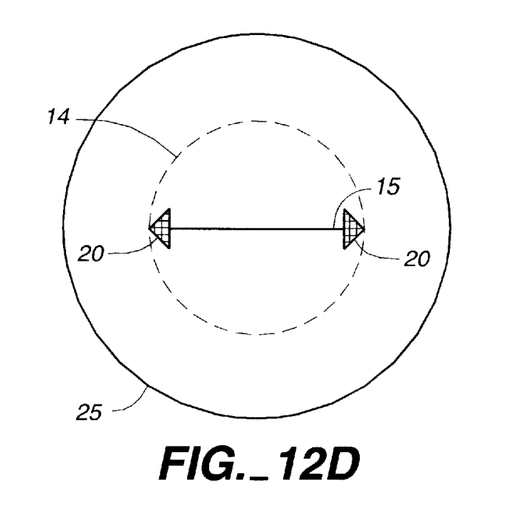

More than one chip can be placed on the diaphragm. FIGS. 12A, B, C, and D show other embodiments with two chips placed on the diaphragm in order to compensate for body mounting stress. (Body mounting stress is the stress caused by mounting the sensor on a structure where pressure is to be measured.) The optimum choices depend upon the stresses transferred to the diaphragm and are therefore dependent upon the application and configuration of the body. FIGS. 12 show four ways of orienting the sensors. The scope of this invention is not limited to these configurations.

Description of Strain-sensing Element Orientation on a Triangular Chip

Figure 13:
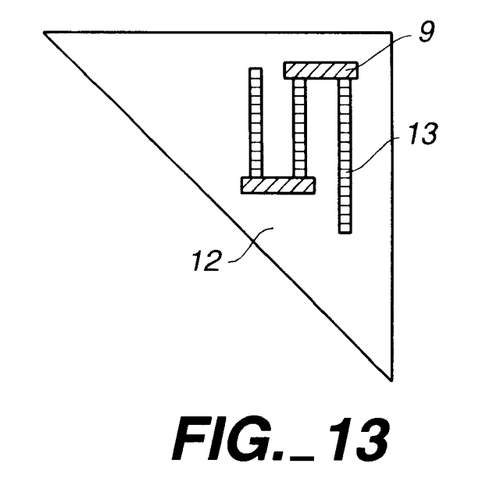
FIG. 13 is a top view of a chip with an alternate strain-sensing element comprising a meandering resistor.

As mentioned above, FIGS. 5A to 5C illustrate in plan view three embodiments of a single rectangular sensing element 13 formed in a triangular chip. In other embodiments, non-rectangular sensing elements can be used. An example of such an embodiment is shown in FIG. 13, which illustrates a meandering strain-sensing region. Again, the required metal pad and contacts are not specifically illustrated in FIG. 13 for sake of clarity.

Figures 6A, 6B:
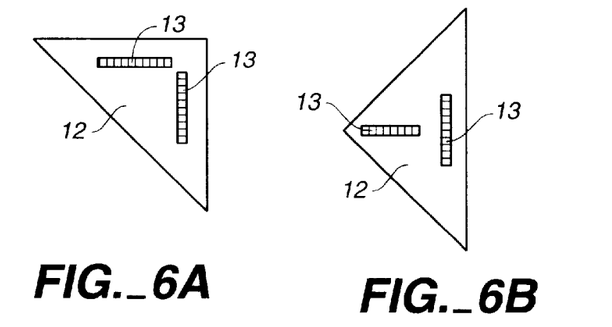
FIGS. 6A, 6B, and 6C depict various embodiments of triangular chips comprising two resistors each. The resistors are typically used to form half of a Wheatstone Bridge.
Figure 6C:
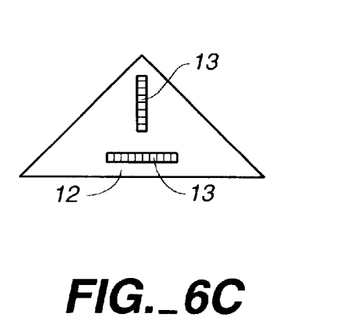

FIGS. 6A, 6B, and 6C represent three options for aligning double strain-sensing elements 13 on the triangular chip 12.

In all cases the strain-sensing elements 13 are parallel to the <110> family of orthogonal axes for maximum pressure sensitivity in the finished device. In this embodiment the two strain-sensing elements 13 are positioned normal to each other. In one embodiment, elements 13 are electrically connected such that each chip forms a half bridge circuit structure. Two chips can then be used to create a full Wheatstone bridge with each chip located at a different place around the diaphragm in order to compensate for body mounting stresses as shown in FIG. 7.

Figure 7:
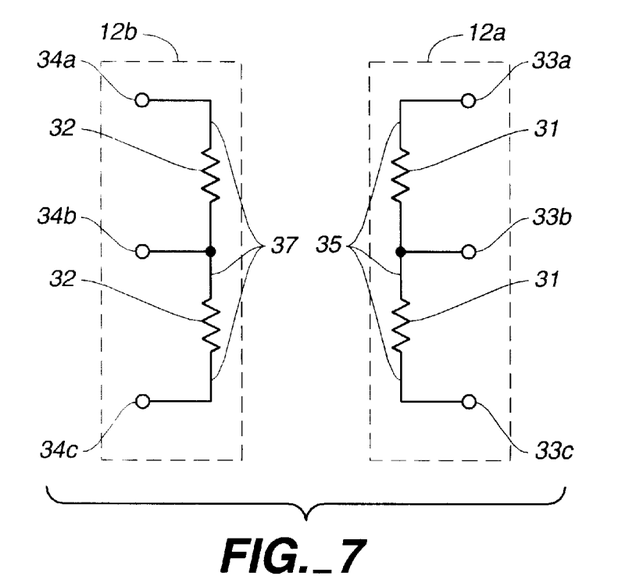
FIG. 7 is a schematic diagram of a full Wheatstone bridge circuit composed of two half bridges. Six wire bonds are required.

FIG. 7 schematically illustrates how the sensing elements in a first chip 12a (shown as resistors 31) and the sensing elements of another chip 12b (shown as resistors 32) can be coupled together to form a Wheatstone bridge. Chip 1 2a in FIG. 7 also includes metalization 35 and electrical contacts 33a, 33b and 33c. Chip 12b includes metalization 37 and electrical contacts 34a, 34b and 34c. During use, leads 33a and 34a are typically connected to a first voltage source terminal, leads 33c and 34c are coupled to a second voltage source terminal, and the voltage across leads 33b, 34b is sensed to determine the stress applied to the diaphragm.

In one embodiment, 5V DC is applied across leads 33a, 33c. In another embodiment, 12V DC is applied. In other embodiments, non-DC voltages are applied. The circuitry coupled to the Wheatstone bridge can be as described in "Solid State Pressure Sensors Handbook", Vol. 16, published by Sensym, Inc. of Milpitas, Calif. in 1998, incorporated herein by reference. See, for example, pp. 8–70 to 8–73 and 8–92 to 8–93.

Four embodiments of how the dual-sensor chips of FIG. 6 can be applied to a diaphragm are shown in FIG. 12. Other possible orientations for other triangular options will be readily apparent to one of ordinary skill in light of this specification.

Figure 8A:
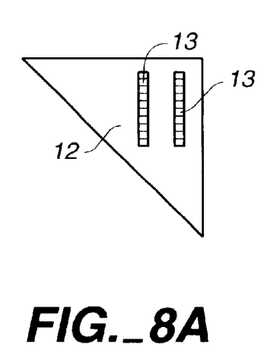
FIGS. 8A, 8B, and 8C depict various embodiments of two-resistor placement in a parallel configuration on a triangular chip. These two resistors do not typically form half bridges.
Figure 8B:
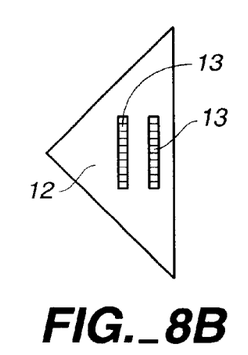
Figure 8C:
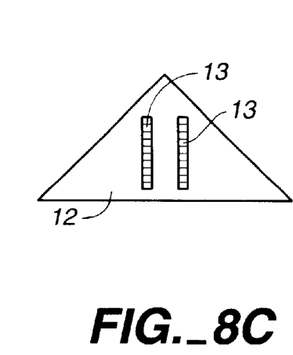
Figure 9:
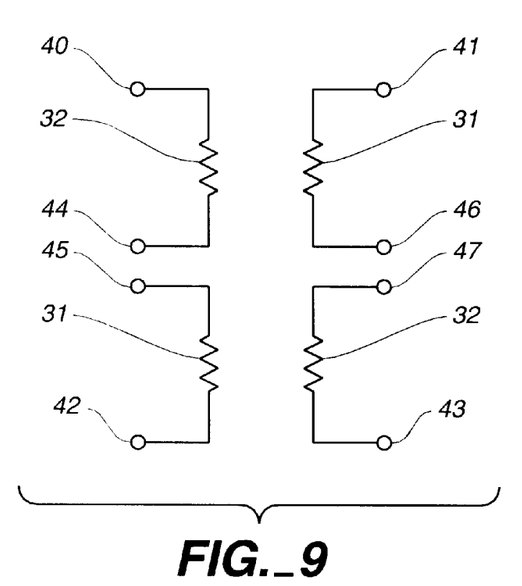
FIG. 9 is a schematic diagram of a full Wheatstone bridge circuit composed of 4 resistors of which the two opposite resistors reside on the same chip. Eight wire bonds are required.

FIGS. 8A, 8B, and 8C represent another three options for aligning double strainsensing elements 13 on the triangular chip 12. In all cases the strain-sensing elements 12 are preferably parallel to a member of the <110> family of axes for maximum pressure sensitivity in the finished device. In the embodiments of FIG. 8, the two strain-sensing elements 13 are positioned parallel to each other. The resistors in this embodiment are used as the opposite resistors in a full bridge. Thus, in FIG. 8, each chip 12 does not constitute a half bridge circuit structure. However, two chips can still be used to create a full bridge with each chip located at a different place around the diaphragm in order to compensate for body mounting stresses as shown in FIG. 9. Strain-sensing elements 31 are located on a first chip. Strain-sensing elements 32 are located on a second chip. Leads 40 and 41 are typically coupled together and to a first power source. Leads 42 and 43 are typically connected together and to a second power source. Leads 44 and 45 are typically connected together and form one output terminal of the Wheatstone bridge, whereas leads 46 and 47 are typically connected together and form the other output of the Wheatsone bridge. The interconnect wiring from chip to chip is more complex, requiring more wire bonds than the embodiment of FIG. 6, but one method is not preferred over the other for reasons other than affordability.

Figure 14:
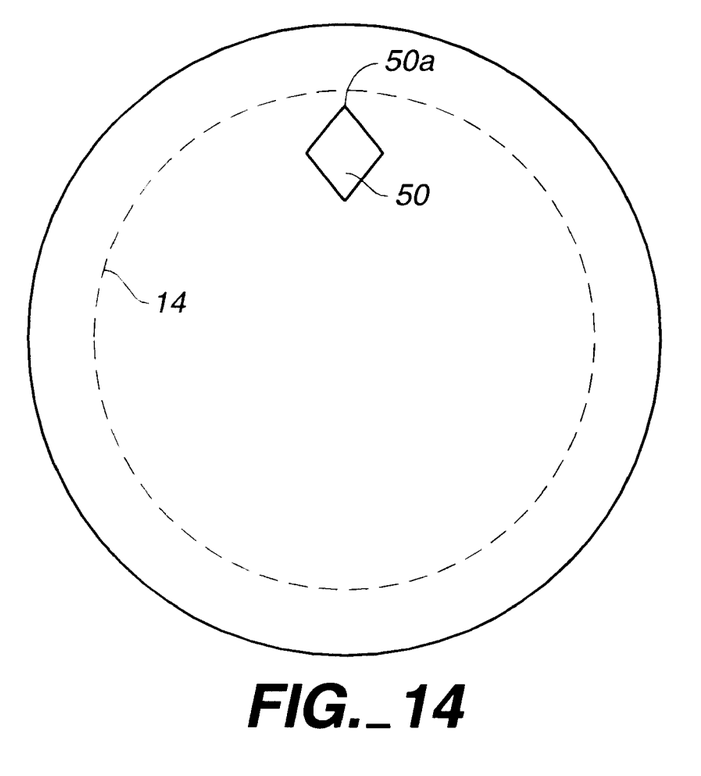
FIG. 14 is an alternative embodiment of a pressure sensor comprising a rectangular chip.

While the invention has been described with respect to specific embodiments, those skilled in the art will appreciate that changes can be made without departing from the spirit and scope of the invention. For example, in lieu of using triangular chips, other shapes can be used. These other shapes typically include a corner pointed toward one of the areas or lines of greatest stress in the diaphragm. For example FIG. 14 illustrates a quadrilateral shaped (e.g. rectangular) chip 50 in which one corner 50a of chip 50 is pointed toward or touching line 14 of greatest stress. The rectangle edges are not parallel to the edge of the diaphragm. In other words, for the case of a circular diaphragm, a line tangent to the line 14 of greatest stress at a point touching or closest to corner 50a of chip 50 is not parallel to the sides of chip 50 closest line 14.

In lieu of resistors using boron-doped p-type silicon, other dopants can be used. Also, n-type silicon can be used, but the optimum sensitivity to stress in n-type silicon is along other crystal directions. See, for example, S. M. Sze, "Semiconductor Sensors" published by John Wiley and Sons, Inc. in 1994, p. 160–181, incorporated herein by reference.

Chips containing sensing elements can be made from materials other than silicon, e.g. as described above. Different techniques can be used to attach the chips to the diaphragm. Different materials can be used to form the sensor. Accordingly, all such changes come within the invention.

What is claimed is:

1. A sensing structure comprising:
   a diaphragm having an edge;
   a triangular chip bonded to the diaphragm, movement of the diaphragm inducing strain at a strain-sensing element within the chip, said sensing structure being a pressure sensor, said pressure sensor sensing pressure applied to said diaphragm, a corner of said triangular chip being located proximate to a high stress area of said diaphragm such that mechanical fatigue of said sensor is reduced and the size and bulk of the portion of the chip at said area is reduced, said chip sensing stress proximate to said area.

2. The sensing structure of claim 1 in which stress changes resistance exhibited by a resistive element within the chip.

3. The sensing structure of claim 1 in which stress changes the capacitance exhibited by a capacitive structure within the chip.

4. The sensing structure of claim 1 in which stress changes a voltage across a piezoelectric material within the chip.

5. The sensing structure of claim 1 in which the triangular shape of the chip minimizes size and bulk of the chip in the highest stress area of the diaphragm.

6. The sensing structure of claim 1, in which the strain-sensing element is defined by at least one doped surface region of the chip.

7. The sensing structure of claim 1, in which the strain-sensing element comprises at least one piezoresistive element on the chip.

8. The sensing structure of claim 7 in which the piezoresistive element is formed by diffusion or ion implantation.

9. The sensing structure of claim 7 in which the piezoresistive element is formed in a silicon surface layer formed on an insulating layer.

10. The sensing structure of claim 1, in which the strain-sensing element comprises at least one mesa structure comprising semiconductor material extending above an insulating layer and a piezoresistive element formed in the semiconductor material.

11. A sensing structure as recited in claim 1, in which the diaphragm is circular and the triangular chip is oriented such that at least one strain-sensing element within the chip is substantially parallel or perpendicular to the radius of the diaphragm.

12. A sensing structure as recited in claim 11, in which the triangular chip is oriented such that one point is directed outward along the diaphragm radius.

13. A sensing structure as recited in claim 12, in which a plurality of triangular chips is located around the edge of the diaphragm.

14. A sensing structure as recited in claim 1, further comprising signal conditioning circuitry electrically interconnected with the strain-sensing element.

15. Structure of claim 1 in which said diaphragm includes a centrally located boss region, and a plurality of silicon chips is located on the diaphragm at or near edges of maximum absolute stress of said diaphragm.

16. Structure of claim 1 in which said diaphragm comprises metal, glass, ceramic or plastic.

17. A method comprising:
   applying electrical current through a resistive element, said resistive element being formed in a triangular chip bonded to a diaphragm, the resistance of said resistive element changing in response to stress applied to said resistive element; and
   providing a measure of the voltage across the resistive element to thereby generate a measure of the stress across said diaphragm, said diaphragm and triangular chip being part of a pressure sensor, said pressure sensor sensing pressure applied to said diaphragm, a corner of said triangular chip being located proximate to a high stress area of said diaphragm to thereby improve the reliability of said sensor, the size and bulk of the portion of the chip at said area being reduced, said chip sensing stress proximate to said area.

18. A method comprising:
   applying a voltage across resistive elements, at least one of said resistive elements being formed in a triangular chip bonded to a diaphragm, the resistance of said at least one resistive element changing in response to stress applied to said resistive element, and
   providing a measure of the voltage across said at least one resistive element to thereby generate a measure of the stress across the diaphragm, said diaphragm and triangular chip being part of a pressure sensor, said pressure sensor sensing pressure applied to said diaphragm, a corner of said triangular chip being located proximate to a high stress area of said diaphragm to thereby improve the reliability of said sensor, the size and bulk of the portion of the chip at said area being reduced, said chip sensing stress proximate to said area.

19. A method comprising the step of sensing the capacitance of a strain-sensing element on a triangular chip, said triangular chip being bonded to a diaphragm, the capacitance of said strain-sensing element changing in response to the stress applied to said strain-sensing element, said diaphragm and triangular chip being part of a pressure sensor, said pressure sensor sensing pressure applied to said diaphragm, a corner of said triangular chip being located proximate to a high stress area of said diaphragm to thereby improve the reliability of said sensor, the size and bulk of the portion of the chip at said area being reduced, said chip sensing stress proximate to said area.

20. A method comprising the step of sensing the voltage across a piezoelectric strain-sensing element on a triangular chip, said triangular chip being bonded to a diaphragm, the voltage across said strain-sensing element changing in response to the stress applied to said strain-sensing element, said diaphragm and triangular chip being part of a pressure sensor, said pressure sensor sensing pressure applied to said diaphragm, a corner of said triangular chip being located proximate to a high stress area of said diaphragm to hereby improve the reliability of said sensor, the size and bulk of the portion of the chip at said area being reduced, said chip sensing stress proximate to said area.

21. A method comprising:

applying electrical current through a resistive element, said resistive element being formed in a triangular chip bonded to a diaphragm, the resistance of said resistive element changing in response to stress applied to said resistive element; and providing a measure of the voltage across the resistive element to thereby generate a measure of the stress across said diaphragm, said diaphragm and triangular chip being part of a pressure sensor, said pressure sensor sensing pressure applied to said diaphragm, a corner of said triangular chip being located proximate to a high stress area of said diaphragm such that mechanical fatigue of said sensor is reduced and the size and bulk of the portion of the chip at said area is reduced, said chip sensing stress proximate to said area.

22. A method comprising:

applying a voltage across resistive elements, at least one of said resistive elements being formed in a triangular chip bonded to a diaphragm, the resistance of said at least one resistive element changing in response to stress applied to said resistive element, and providing a measure of the voltage across said at least one resistive element to thereby generate a measure of the stress across the diaphragm, said diaphragm and triangular chip being part of a pressure sensor, said pressure sensor sensing pressure applied to said diaphragm, a corner of said triangular chip being located proximate to a high stress area of said diaphragm such that mechanical fatigue of said sensor is reduced and the size and bulk of the portion of the chip at said area is reduced, said chip sensing stress proximate to said area.

23. A method comprising the step of sensing the capacitance of a strain-sensing element on a triangular chip, said triangular chip being bonded to a diaphragm, the capacitance of said strain-sensing element changing in response to the stress applied to said strain-sensing element, said diaphragm and triangular chip being part of a pressure sensor, said pressure sensor sensing pressure applied to said diaphragm, a corner of said triangular chip being located proximate to a high stress area of said diaphragm such that mechanical fatigue of said sensor is reduced and the size and bulk of the portion of the chip at said area is reduced, said chip sensing stress proximate to said area.

24. A method comprising the step of sensing the voltage across a piezoelectric strain-sensing element on a triangular chip, said triangular chip being bonded to a diaphragm, the voltage across said strain-sensing element changing in response to the stress applied to said strain-sensing element, said diaphragm and triangular chip being part of a pressure sensor, said pressure sensor sensing pressure applied to said diaphragm, a corner of said triangular chip being located proximate to a high stress area of said diaphragm such that mechanical fatigue of said sensor is reduced and the size and bulk of the portion of the chip at said area is reduced, said chip sensing stress proximate to said area.

25. A sensing structure comprising:

a diaphragm having an edge;

a triangular chip bonded to the diaphragm, movement of the diaphragm inducing strain at a strain-sensing element within the chip, said sensing structure being a pressure sensor, said pressure sensor sensing pressure applied to said diaphragm, a corner of said triangular chip being located proximate to a high stress area of said diaphragm to thereby improve the reliability of said sensor and to reduce the size and bulk of the portion of the chip at said area, said chip sensing stress proximate to said area.

* * * * *